Aug. 17, 1926.
M. L. MITCHELL
HOLDER FOR GARDEN HOSE
Filed May 14, 1925
1,596,752
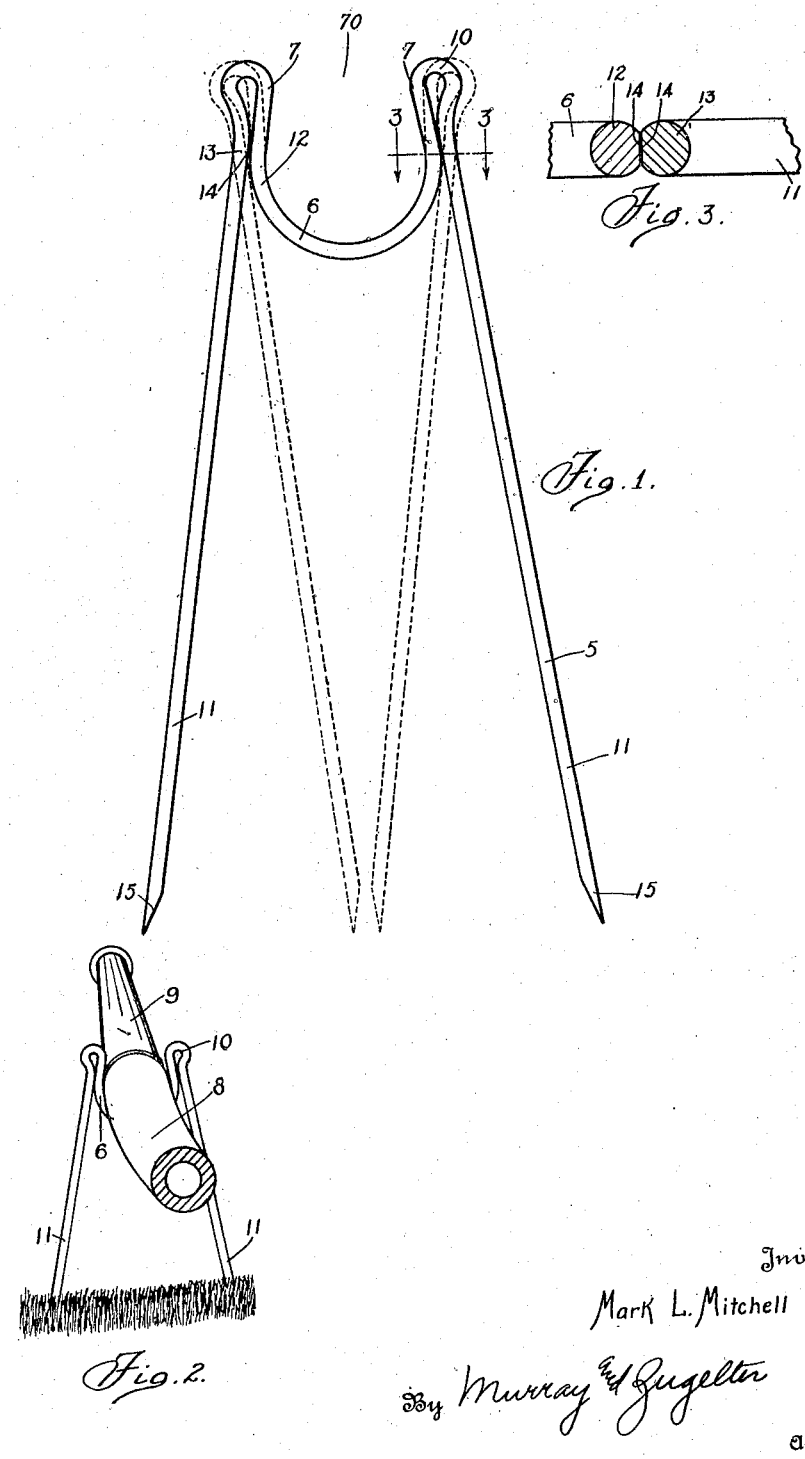
Inventor
Mark L. Mitchell Patented Aug. 17, 1926.

1,596,752

UNITED STATES PATENT OFFICE.

MARK L. MITCHELL, OF CINCINNATI, OHIO.

HOLDER FOR GARDEN HOSE.

Application filed May 14, 1925. Serial No. 30,301.

An object of my invention is to provide a holder for garden hose which may be expeditiously applied to and removed from such hose.

Another object is to provide a device of this character which is simple of construction and inexpensive to manufacture.

Another object is to provide a device of this kind which is efficient in its function in retaining the discharge end of a hose in a desired position.

These and other objects are attained by the means desrcibed herein and disclosed in the accompanying drawings in which:—

Fig. 1 is a side elevation of the device of my invention and showing in dotted lines the position of its parts when opened to receive a hose.

Fig. 2 is a perspective view of the device in an operative position holding a hose.

Fig. 3 is an enlarged cross sectional view taken on line 3—3 of Fig. 1.

The hose holder of my invention is formed of a single length of steel spring wire 5, having an intermediate portion bent into a substantial C-shaped clamp 6. The ends 7 of the clamp normally overhang the body of the clamp 6 and these members are adapted to engage the major portion of a circumference of a hose 8 or nozzle 9, securing said hose or nozzle therein. The free ends of the wire are then turned upon themselves adjacent the overhanging ends 7, a small open loop portion 10 being employed in order to avoid cracking or crystallization of the wire, thereby forming an effective connection between ends 7 and prongs 11 which normally diverge as shown in solid lines in Fig. 1. The body of the clamp 6 and prongs 11 all lie in the same plane. The intermediate portions 12 and 13 of the clamp 6 and prongs 11 respectively are normally tangent and have their adjacent side portions 14 flattened to provide substantial bearing or abutment surfaces so that when the ends 15 of prongs 11 are moved toward one another, as shown in dotted lines in Fig. 1, the prongs are fulcrumed at 13 on the portions 12 of the body 6. Movement of prongs 11 toward one another will serve to move the overhanging ends 7 away from one another to open the mouth 70 of the clamp 6 to permit insertion of a hose. The prongs being grasped near the ends 15, serve as levers so that the strong spring action of the body 6 is readily overcome. The faces 14 prevent the clamp and prongs from slipping sidewardly past one another. When the prongs 11 are released, the resiliency of the spring wire returns the parts to their normal positions, the overhanging ends 7 precluding accidental separation of a hose 8 from the clamp 6.

The clamping action upon the hose 8 is augmented when the sharp points 15 of the prongs 11 are forced into the ground because this tends to force said prongs farther apart with a resultant inward movement of the overhanging ends 7.

To remove the hose 8 from the clamp, the device is pulled out of the ground whereupon the prongs 11 are again pressed together as previously explained, to separate the overhanging ends 7 and open the mouth 70 of the clamp 6.

The device may be dipped in enamel of a suitable color, or may be otherwise treated to provide a rust resisting flexible coating.

The operation of the device is obvious.

It will be noted that I have provided a holder for garden hose and the like which is simple and inexpensive to manufacture and one which is easy to manipulate.

What I claim is:—

A holder of the class described, comprising a C-shaped resilient clamp having normally overhanging end portions and integral prongs extending from said end portions each having a bearing face contacting the clamp, portions of said clamp serving as fulcrums about which the prongs may move to separate the overhanging ends of the clamp.

In testimony whereof, I have hereunto subscribed my name this 12th day of May, 1925.

MARK L. MITCHELL.